United States Patent [19]

Person

[11] Patent Number: 5,437,204
[45] Date of Patent: Aug. 1, 1995

[54] SYSTEM FOR SELECTING THE OPERATING RANGES OF AN AUTOMATIC TRANSMISSION

[75] Inventor: Dennis W. Person, Canton, Mich.

[73] Assignee: Ford Motor Company, Dearborn, Mich.

[21] Appl. No.: 169,268

[22] Filed: Dec. 20, 1993

[51] Int. Cl.$^6$ .............................................. B60K 41/24
[52] U.S. Cl. ........................... 74/335; 475/133; 475/134; 477/125
[58] Field of Search ............... 74/335; 475/132, 133, 475/134; 477/125, 126, 131

[56] References Cited

U.S. PATENT DOCUMENTS

| | | | |
|---|---|---|---|
| 3,797,330 | 3/1974 | Ushijima | 475/132 X |
| 3,937,105 | 2/1976 | Arai et al. | 477/125 |
| 4,610,179 | 9/1986 | Parker . | |
| 4,726,262 | 2/1988 | Hayakawa et al. | 475/133 X |
| 4,821,590 | 4/1989 | Tury et al. . | |
| 4,831,896 | 5/1989 | Sakakiyama . | |
| 4,896,135 | 1/1990 | Deeds et al. . | |
| 4,984,486 | 1/1991 | Takada et al. | 477/126 |
| 4,987,792 | 1/1991 | Mueller et al. . | |
| 4,998,444 | 3/1991 | Mabee . | |
| 5,009,128 | 4/1991 | Seidel et al. . | |
| 5,085,106 | 2/1992 | Bubnash . | |
| 5,142,928 | 9/1992 | Buti et al. . | |
| 5,161,422 | 11/1992 | Suman et al. . | |
| 5,197,344 | 3/1993 | Maier et al. . | |

*Primary Examiner*—Charles A. Marmor
*Assistant Examiner*—Nathan O. Jensen
*Attorney, Agent, or Firm*—Frank G. McKenzie; Roger L. May

[57] ABSTRACT

A system for directing line pressure alternately to a forward drive circuit and a reverse drive circuit includes three solenoid-operated select valves that direct pressure from a line pressure source to a reverse drive select valve, a forward drive select valve, reverse drive select valve, a range select switch assembly, pressure switches, and two coaxial range control valves. The two drive select valves are interconnected to form a hydraulic latch whose outputs are connected to the range control valve such that either the forward drive friction elements are pressurized, the reverse drive friction elements are pressurized, or none of the friction elements are pressurized.

9 Claims, 3 Drawing Sheets

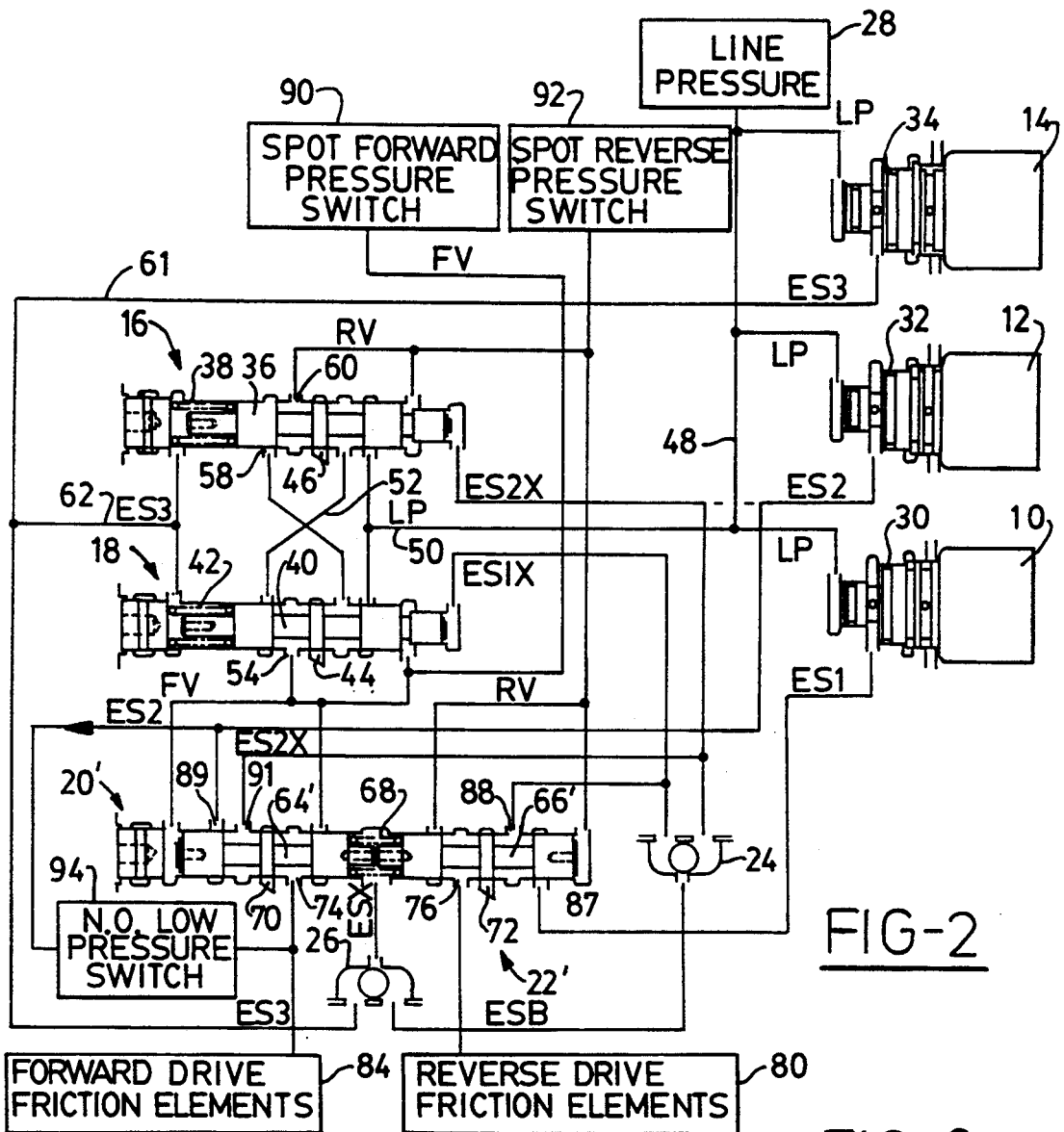

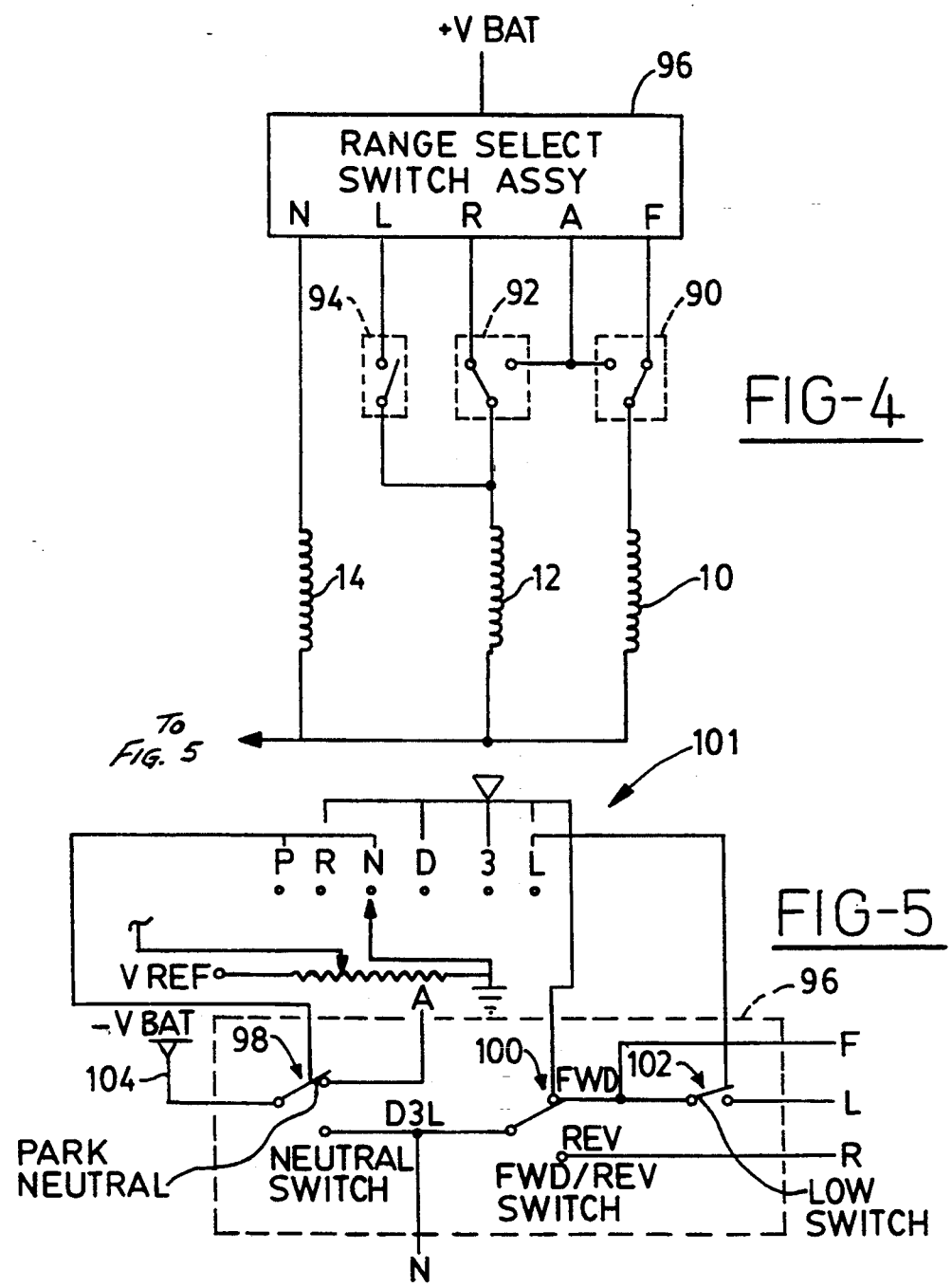

SYSTEM FOR SELECTING THE OPERATING RANGES OF AN AUTOMATIC TRANSMISSION

BACKGROUND OF THE INVENTION

1. Field of the Invention

This invention relates to the controls of automatic transmissions for automotive use. More particularly, the invention pertains to gear shift controls that produce the operating ranges selected by a vehicle operator.

2. Description of the Prior Art

In the operation of an actuation and control circuit of an automatic transmission, various friction elements of the transmission, i.e., hydraulically actuated clutches, brakes and servos, are engaged and released to produce the gear ratios of the forward drive range and reverse drive range. Hydraulic fluid, at elevated pressure, is supplied to several friction elements, each having a hydraulic piston located within a cylinder, thereby causing frictional contact among stacked friction plates connected to the driving and driven members.

When the friction element is disengaged during a gear ratio change, the torque capacity of the friction element is lowered by venting hydraulic fluid from the cylinder to a low pressure sump located below the circuit.

In a conventional device for selecting the operating range of an automatic transmission, movement of the gear selector lever by the vehicle operator is transmitted by a mechanical linkage to a manual valve, a component in the actuation and hydraulic control circuit that is supplied with regulated line pressure and directs line pressure selectively to output ports of the manual valve. A spool of the manual valve moves in accordance with the corresponding position of the gear selector lever to which it is mechanically connected. For example, if the gear selector is moved to a drive range (D or OD), the manual valve connects the regulated line pressure source to an output port through which all of the passages of the hydraulic circuit required to be pressurized to produce the selected gear ratios are pressurized.

When the gear selector is moved from a forward drive position to the reverse position, the manual valve closes the output port that supplies pressure to the passages requiring pressurization in the forward drive condition, and instead connects the line pressure source to an output port that pressurizes the lines required to be pressurized to produce reverse drive. When the gear selector is moved to the forward drive position from the reverse drive position, the manual valve closes the output port that supplies pressure to the passages requiring pressurization in the reverse drive condition, and instead connects the line pressure source to an output port that pressurizes the lines required to be pressurized to produce forward drive. When the gear selector is moved to the neutral position, the manual valve closes the output ports of the manual valve.

Modern automatic transmissions are increasingly using electronic controls to provide improved transmission function. Electronic controls are being used to control transmission line pressure, shift scheduling, and shift quality. This invention relates to using electronic controls for selecting the range, i.e., forward, reverse, and neutral. Electronic range selection would replace the conventional manual control valve and associated internal and external linkage.

SUMMARY OF THE INVENTION

It is an object of the invention to replace a conventional manual control valve and the linkage that transmits movement of the range selector to the manual valve.

It is another object of this invention to provide a system for alternately connecting and disconnecting a source of fluid pressure and the friction elements of an automatic transmission that produce forward drive and reverse drive. The system includes an hydraulic latch having a three-position range control. The system requires setting the state of two solenoids and pulsing a third solenoid to select the forward and reverse ranges. The hydraulic latch ensures the range selection is mutually exclusive: when the forward drive circuit is pressurized, the reverse drive circuit is inactive, and when the reverse drive circuit is pressurized, the forward drive circuit is inactive. If both range control valves are against a valve body or stroked against a spring, the neutral range is produced.

In realizing these objectives the system of this invention for producing selected operating ranges of an automatic transmission in accordance with the position of a range selector includes a range selector moveable manually among positions corresponding to the operating ranges of the transmission; hydraulically actuated friction elements engaged and released alternately to produce low drive, forward drive, reverse drive and neutral operation of the transmission; a source of fluid pressure providing the means for actuating the friction elements; three solenoid-operated valves, hydraulically connected to the pressure source, open and close communication between the pressure source and system in accordance with the energized and deenergized state of the solenoids.

The hydraulic circuit includes first, second and third solenoid-operated control valves, a forward select valve and reverse select valve controlled by the first, second and third solenoid-operated control valves, for opening and closing communication between the pressure source and friction elements in response to the position of the range selector.

A range select switch assembly selectively connects and disconnects an electric power source and said solenoids in response to the position of the range selector. Several pressure switches disconnect the electric power source and the first solenoid when the forward drive friction elements are pressurized, and disconnect the electric power source and the second solenoid when the reverse drive friction elements are pressurized. The state of the solenoids changes in response to a change in the position of the range selector, operated manually by the vehicle operator to select the gear of the transmission.

A forward select valve, controlled by pressure produced by the first and third solenoid-operated valves, hydraulically connects and disconnects the pressure source and a first outlet port. A reverse select valve, controlled by pressure produced by the second and third solenoid-operated valves, hydraulically connects and disconnects the pressure source and a second outlet port. A range control, responsive to pressure produced by the first, second and third solenoid-operated valves, hydraulically connects the first outlet port and the friction elements that produce forward drive, connects the second outlet port and the friction elements that produce reverse drive, and disconnects the first and second outlet ports and the friction elements.

BRIEF DESCRIPTION OF THE DRAWING

FIG. 2 is an electro-hydraulic schematic diagram of a system according to the invention, and FIG. 3 is a truth table that shows the status of the valves, circuits, and ranges of the transmission.

FIG. 4 is a schematic diagram of a pressure switch circuit for connecting solenoids to a range select switch after selecting the range of an automatic transmission.

FIG. 5 is a range select switch that responds to the range select lever of an automatic transmission.

FIG. 6 is a schedule showing the state of various inputs and the resulting outputs of the range select switch of FIG. 5.

DESCRIPTION OF THE PREFERRED EMBODIMENT

Figures 1, 1A:
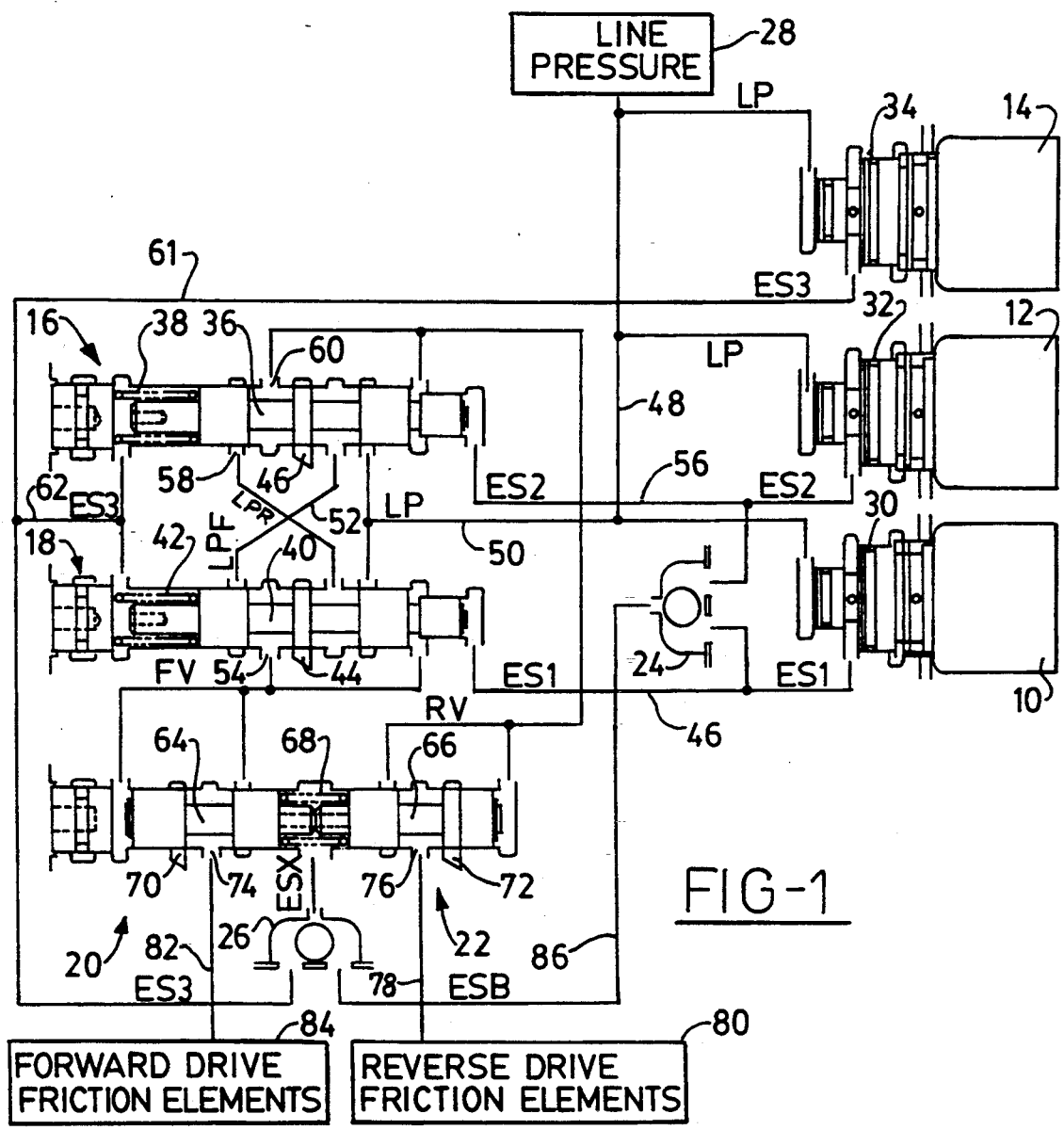
FIG. 1 is an electro-hydraulic schematic diagram of a system according to the invention.
FIG. 1A is a schedule showing the states of solenoid-operated valves, the hydraulic circuits, and the corresponding operating ranges of the transmission.

In the electro-hydraulic schematic shown in FIG. 1, three 3-way ON-OFF solenoids 10, 12, 14 are shown. Normally-closed solenoids 10, 12 are used to select the forward drive range and reverse drive range, and a normally-open solenoid 14 is used to select the neutral range. Four hydraulic valves are used: a reverse select valve 16, forward select valve 18, and two range control valves 20, 22. The hydraulic circuit also contains two shuttle check valves 24, 26.

A source of line pressure LP 28 is connected to each solenoid-operated valve 30, 32, 34, the reverse select valve 16, and forward select valve 18. The forward select valve 18 and reverse select valve 16 are hydraulically connected mutually. The reverse select valve 16 is controlled by the reverse select solenoid 12. The forward select valve 18 is controlled by the forward select solenoid 10. Valves 16, 18 are also controlled by the neutral select solenoid 14, which provides a signal to clear the latch. The output of each valve 16, 18 provides another control signal for the other valve 16, 18 and is used to latch valve 16 against a spring. Only one output of either valve 16 or 18 is at line pressure at any one time.

Operation of the latch requires that the neutral select solenoid 14 be turned on. This action vents pressure on the spring side of each range select valve 16, 18. Spool 36 of valve 16 is biased by spring 38, spool 40 of valve 18 is biased by spring 42.

If solenoids 10 and 12 are both off, each select valve 16, 18 moves rightward due to the spring force. Output pressures FV and RV are vented at vent ports 44, 46, respectively, through their respective range select valve.

If solenoids 10 and 12 are both on, each select valve 18, 16 moves leftward, compressing springs 42, 38. The output FV is vented at 46 through the LPF circuit. Output RV is vented at 44 through the LPR circuit. The LPF circuit is vented through the reverse select valve 16, and the LPR circuit is vented through the forward select valve 18.

If the forward select solenoid 10 is turned on, forward select valve 18 moves against the spring due to pressure ES1 in line 46. With solenoid 12 off, line pressure LP is connected through lines 48, 50, reverse select valve 16 to LPF line 52, and then through forward select valve 18 to FV port 54.

The forward select solenoid 10 can then be turned off. If the reverse select solenoid 12 is turned on, the reverse select valve spool 36 moves leftward against spring 38 due to pressure in line 56. With solenoid 10 off, line pressure LP is connected through line 50, forward select valve 18 to LPR port 58, and then through the reverse select valve 16 to the RV port 60. The reverse select solenoid 12 can then be turned off.

When either the forward select valve 18 or reverse select valve 16 is against its spring, turning the neutral select solenoid 14 off will clear the latch. ES3 pressure in lines 61, 62 is applied to both select valves 16, 18 and allows the springs 38, 42 to return the valves to their neutral positions.

The FV and RV outputs from the latch are used to control two range control valves 20, 22. The spools 64, 66 of the two range control valves 20, 22 are contained in a single bore with a spring 68 between the valves. This arrangement effectively provides three positions: forward, reverse, and neutral. Neutral position is produced when the two spools 64, 66 are separated by the force of spring 68. Forward pressure output FV is vented at 70 through control valve 20, and the reverse pressure output RV is vented at 72 through the range control valve 22. Forward drive position is produced when pressure FV moves range control valve spool 64 rightward, compressing spring 68. In the forward drive position, pressure FV is connected to the forward pressure output port 74. Reverse drive position is provided when pressure RV moves range control valve spool 66 leftward, compressing spring 68. In the reverse drive position, pressure RV is connected to the reverse drive pressure output port 76.

RV pressure is carried in line 78 to the friction elements 80 of the transmission that cause the gearsets to produce reverse drive. FV pressure is carried in line 82 to the friction elements that produce forward drive. U.S. Pat. No. 4,932,282 describes how a low reverse brake and a forward clutch are pressurized through a manual valve for these purposes. The entire disclosure of U.S. Pat. No. 4,932,282 is incorporated herein by reference.

The range control valves 20, 22 are also controlled by pressure ESX. Pressure ESX is the higher of the forward select solenoid pressure ES1, reverse select solenoid pressure ES2, and neutral select solenoid pressure ES3. The forward select solenoid ES1 pressure and reverse select solenoid ES2 pressure are connected through check valve 24 to the ESB line 86. The neutral select solenoid ES3 pressure and pressure in line 86 are connected through check valve 26 to the ESX line 88. The function of ESX pressure is to keep the range control valves 20, 22 in the neutral position if any of the range select solenoid valves 30, 32, 34 have an output pressure.

Operation of the range control valves 20, 22 occurs when the range select solenoid pressures ES1, ES2, ES3 are vented. If the neutral select solenoid 14 is turned off, the range control valves 20, 22 move to the neutral position. The latch is cleared as described previously.

When the forward select solenoid 10 is on, solenoid 12 is off, and solenoid 14 is on, the latch will provide pressure FV. However, as long as the forward select solenoid 10 remains on, the range control valves 20, 22 are held in the neutral position by the spring 68. When the forward select solenoid 10 is turned off, pressure FV then moves range control valve spool 64 rightward, compressing spring 68. Pressure FV is then connected to the forward pressure output port 74.

When the reverse select solenoid 12 is turned on, solenoid 10 is off, and solenoid 14 is on, the latch will provide pressure RV. However, as long as the reverse select solenoid 12 remains on, the range control valves will be held in the neutral position by the spring 68. When the reverse select solenoid 12 is turned off, pressure RV then moves range control valve spool 66 leftward, compressing spring 68. Pressure RV is then connected to the reverse pressure output port.

The state table of FIG. 2 shows the possible states of the electrical inputs to the solenoids 10, 12, 14, the hydraulic circuit pressures FV, RV, ESX, the forward and reverse output pressures, and the range obtained in each state. As is shown in the state table, selection of forward range or reverse range requires setting the state of two solenoids and then applying the appropriate pulse to the third solenoid. Simply setting the solenoid states will select the neutral range. This ensures that the solenoids are under electronic control in order to prevent selection of a range that is opposite to that desired. If any of the solenoids fail, only neutral or the desired range can be produced.

FIG. 3 is a refinement of the hydraulic circuit described above with reference to FIGS. 1 and 1A. The refinement consists of connecting solenoid-operated valves 30, 32 (ES1 and ES2 pressure) to the additional ports 87, 89, respectively, of the range control valves 20', 22' instead of directly to the select valves 16, 18. By adding these ports and ports 88, 91 to valves 20', 22', pressure ES1X and ES2X at the end of the small diameter of the select valves 16, 18 can be either connected to the appropriate solenoid pressure ES1 and ES2 or to vent ports 70, 72. This arrangement prevents ES1 pressure produced by energizing solenoid 10 from producing forward drive when the range control is in the reverse position. Conversely, energizing solenoid 12 will not produce reverse drive when the range control is in the forward position. When range control valves 20', 22' are in the neutral position, ES1 pressure is connected to ES1X pressure through valve 22', and ES2 pressure is connected to ES2X pressure through valve 20'. When the range control is in the forward position, ES2X pressure is vented at port 70. Therefore, if solenoid 12 is energized, ES2 pressure does not act on reverse select valve 16. Similarly, when the range control is in the reverse position, ES1 pressure does not act on the forward select valve 18 if solenoid 10 is energized.

Only three effective positions are obtained: Forward, neutral and reverse. The range control valves each have only two positions. However, the three positions of the range control result by placing the range control valves in the same cylinder with a common spring such that the spring places the valves in the neutral position.

FIG. 3 contains three pressure switches 90, 92, 94, which are used to control the three solenoids 10, 12, 14 and pressures ES1, ES2, ES3. FIG. 4 shows an electrical schematic showing the connections required among the three pressure switches, the three range select solenoids 10, 12, 14, and a range select switch assembly 96, which is part of a shift lever assembly operated by the vehicle driver.

Internally, assembly 96 contains three switches connected as shown in FIG. 5. The three switches consist of a single pole-double throw SPDT NEUTRAL switch 98, a SPDT FWD/REV switch 100, and a single pull-single throw SPST LOW switch 102. The table in FIG. 6 shows the switch connections required for each range position PARK, REVERSE, NEUTRAL, DRIVE, THIRD, and LOW (P.R.N.D.3.L) selected by the vehicle operator by manipulating the gear selector or range selector 101.

Assembly 96 contains six connections labeled $+V_{bat}$, N, L, R, A, and F. $V_{bat}$ 104 is connected to the vehicle battery through a switch such as an ignition switch or electrical relay. N is connected to the power connection of the neutral select solenoid 14. L is connected to one contact of the normally-open (N.O.) low pressure switch 94. R is connected to one contact of both the reverse pressure switch 92 and the forward pressure switch 90, which are both normally-closed (N.C.). F is connected to the normally-closed contact of the forward pressure switch 90. The common terminal of the forward pressure switch 90 is connected to the power side of the forward select solenoid 10 (ES1). The common terminal of the reverse pressure switch 92 is connected to the power side of the Low/Reverse select solenoid 12 (ES2). The Low/Reverse select solenoid 12 (ES2) also is connected to a terminal of the low pressure switch 94.

Operation of the electrical circuit of FIG. 4 is described next. When the range selector is in the P or N position, the neutral select solenoid 14 (ES3) is off because the NEUTRAL switch 98 of assembly 96 does not connect $V_{bat}$ 104 to the N circuit. Since the neutral solenoid 14 (ES3) is a normally-open solenoid, hydraulic oil will flow through the solenoid and acts on the FWD/REV select valves 16, 18 and the range control valves 20, 22 (refer to FIGS. 1 and 3). The hydraulic pressure acts on these valves to move them to their neutral positions as described above.

When the range selector is moved from the P or N positions to the R position, NEUTRAL switch 98 of the assembly 96 connects $V_{bat}$ to the N circuit and R circuit through the FWD/REV switch 100. The N circuit turns on the neutral select solenoid 14 (ES3). This vents hydraulic oil, which is acting on the select valves 16, 18 and the range control valves 20, 22, forcing these valves to produce the neutral range. The R circuit will turn on the Low/Reverse select solenoid 12 (ES2). Referring to FIG. 3, when the Low/Reverse select solenoid 12 is turned on, hydraulic oil flows through the solenoid and range control valve 22 and moves the reverse select valve 16. After valve 16 moves, hydraulic pressure in the RV circuit acts on the reverse pressure switch 92 causing the switch to break the N.C. contact and to close the N.O. contact. Referring to the electrical circuit of FIG. 4, this action connects the Low/Reverse select solenoid 12 to the A circuit of assembly 96. Since the A circuit is not connected to $V_{bat}$ when the range selector is in the R position, the Low/Reverse select solenoid 12 (ES2) is turned off. As can be seen from the above description, a low-high-low pulse is obtained at the Low/Reverse select solenoid 12 (ES2). This is required as shown in the truth table of FIG. 3 in order to select the reverse range.

When the range selector is moved from the N position to the D, 3, or L position, the neutral switch 98 of the assembly 96 connects $V_{bat}$ to the N circuit and the F circuit through the FWD/REV switch 100. The N circuit turns on the neutral select solenoid 14 (ES3). This vents hydraulic oil, which is acting on the select valves and the range control valves, thereby forcing the valves to provide the neutral range. The F circuit turns on the forward select solenoid 10 (ES1). Referring to FIG. 3, when the forward select solenoid 10 is turned on, hydraulic pressure moves the forward select valve 18, causing hydraulic pressure in the FV circuit to act on the forward pressure switch 90. Hydraulic pressure cause the switch to break the N.C. contact and to close the N.O. contact. Referring to the electrical circuit of FIG. 4, this action causes the forward select solenoid 10, to be connected to the A circuit of assembly 96. Since the A circuit is not connected to $V_{bat}$ when the range selector is in the D, 3, or L position, the forward select solenoid 10 (ES1) is turned off. As can be seen from the above description, a low-high-low pulse is obtained at the forward select solenoid 10 (ES1). This is required, as shown in the truth table of FIG. 3, in order to select the forward range.

After the forward range is selected as described above, forward pressure acts on the low pressure switch 94, which connects the Low/Reverse select solenoid 12 (ES2) to the L circuit of the Assembly 96. Referring to the table of FIG. 6, only when the range selector is in the L position will low switch 102 of assembly 96 connect the L circuit to $V_{bat}$; only then will the Low/Reverse select solenoid 12 (ES2) be turned on. When the Low/Reverse solenoid is on, a hydraulic pressure signal is provided as needed by the hydraulic controls to select manual low gear.

Having described a preferred embodiment of this invention, what I claim and desire to secure by U.S. Letters Patent is:

1. A system for producing operating ranges of an automatic transmission having hydraulically actuated forward drive and reverse drive friction elements engaged and released alternately to produce a forward drive range, reverse drive range and neutral range, comprising:
    a range selector moveable manually among positions corresponding to the operating ranges of the transmission;
    a fluid pressure source;
    hydraulic circuit means including first, second and third solenoid-operated control valves, a forward select valve and reverse select valve controlled by the first, second and third solenoid-operated control valves, for opening and closing communication between the pressure source and friction elements in response to the position of the range selector;
    an electric power source;
    range select switch means for selectively connecting and disconnecting the electric power source and said solenoids in response to the position of the range selector;
    pressure switch means for disconnecting the electric power source and the first solenoid when the forward drive friction elements are pressurized, and for disconnecting the electric power source and the second solenoid when the reverse drive friction elements are pressurized.

2. The system of claim 1 wherein the hydraulic circuit means vents the friction elements when the range selector is in the neutral range position, pressurizes the forward drive range friction elements when the range selector is in the forward range position, and pressurizes the reverse drive friction elements when the range selector is in the reverse range position.

3. The system of claim 1 wherein the range select switch means further comprises:
    neutral switch means for connecting the electric power source and said third solenoid when the range selector is in the reverse or forward drive range position, disconnecting the electric power source and said first solenoid when the range selector is in the neutral drive range position, potentially connecting the electric power source and said second solenoid when the range selector is in the neutral drive range position, and disconnecting the electric power source and said potential connection when the range selector is in the reverse drive range position or forward drive range position.

4. The system of claim 1 wherein the range select switch means further comprises:
    forward-reverse switch means for connecting the electric power source and said first solenoid when the range selector is in the forward drive range position, disconnecting the electric power source and said first solenoid when the range selector is in the reverse drive range position, potentially connecting the electric power source and said second solenoid when the range selector is in the reverse drive range position, and disconnecting the electric power source and said potential connection when the range selector is in the forward drive range position.

5. The system of claim 1 wherein the range select switch means further comprises a low switch means for potentially connecting the electric power source and said second solenoid when the range selector is in the low drive range position, and for disconnecting the electric power source and said potential connection when the range selector is in a position other than the low drive range position.

6. The system of claim 1 wherein the range select switch means further comprises:
    neutral switch means for connecting the electric power source and said third solenoid when the range selector is in the reverse or forward drive range position, disconnecting the electric power source and said first solenoid when the range selector is in the neutral drive range position, potentially connecting the electric power source and said second solenoid when the range selector is in the neutral drive range position, and disconnecting the electric power source and said potential connection when the range selector is in the reverse drive range position or forward drive range position; and
    forward-reverse switch means for connecting the electric power source and said first solenoid when the range selector is in the forward drive range position, disconnecting the electric power source and said first solenoid when the range selector is in the reverse drive range position, potentially connecting the electric power source and said second solenoid when the range selector is in the reverse drive range position, and disconnecting the electric power source and said potential connection when the range selector is in the forward drive range position.

7. The system of claim 1 wherein pressure switch means comprises:
    forward pressure switch means for connecting and disconnecting the electric power source and said first solenoid in response to the magnitude of pressure directed to the forward drive friction elements; and reverse pressure switch means for connecting and disconnecting the electric power source and said second solenoid in response to the magnitude of pressure directed to the reverse drive friction elements.

8. The system of claim 1 wherein the transmission includes low drive friction elements and the pressure switch means further comprises low pressure switch means for connecting and disconnecting the electric power source and said second solenoid in response to the magnitude of pressure directed to the low drive friction elements.

9. A system for producing operating ranges of an automatic transmission having hydraulically actuated forward drive and reverse drive friction elements engaged and released alternately to produce a forward drive range, reverse drive range and neutral range, comprising:

a range selector moveable manually among positions corresponding to the operating ranges of the transmission;

a fluid pressure source;

hydraulic circuit means including first, second and third solenoid-operated control valves, a forward select valve and reverse select valve controlled by the first, second and third solenoid-operated control valves, for opening and closing communication between the pressure source and friction elements in response to the position of the range selector;

an electric power source;

range select switch means for selectively connecting and disconnecting the electric power source and said solenoids in response to the position of the range selector, including neutral switch means for connecting the electric power source and said third solenoid when the range selector is in the reverse or forward drive range position, disconnecting the electric power source and said first solenoid when the range selector is in the neutral drive range position, potentially connecting the electric power source and said second solenoid when the range selector is in the neutral drive range position, and disconnecting the electric power source and said potential connection when the range selector is in the reverse drive range position or forward drive range position; and forward-reverse switch means for connecting the electric power source and said first solenoid when the range selector is in the forward drive range position, disconnecting the electric power source and said first solenoid when the range selector is in the reverse drive range position, potentially connecting the electric power source and said second solenoid when the range selector is in the reverse drive range position, and disconnecting the electric power source and said potential connection when the range selector is in the forward drive range position; and pressure switch means for disconnecting the electric power source and the first solenoid when the forward drive friction elements are pressurized, and for disconnecting the electric power source and the second solenoid when the reverse drive friction elements are pressurized, including forward pressure switch means for connecting and disconnecting the electric power source and said first solenoid in response to the magnitude of pressure directed to the forward drive friction elements, and reverse pressure switch means for connecting and disconnecting the electric power source and said second solenoid in response to the magnitude of pressure directed to the reverse drive friction elements.

* * * * *